US011403285B2

(12) United States Patent
Chard et al.

(10) Patent No.: US 11,403,285 B2
(45) Date of Patent: Aug. 2, 2022

(54) ITEM-SPECIFIC SEARCH CONTROLS IN A SEARCH SYSTEM

(71) Applicant: eBay Inc., San Jose, CA (US)

(72) Inventors: Jonathan David Chard, Portland, OR (US); Erin Miller, San Jose, CA (US); Tyler Yong Nugent, Portland, OR (US); Yihung Lee, San Jose, CA (US); Benjamin Blechman, Portland, OR (US); Brian Wayne Davis, Hillsboro, OR (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 16/560,276

(22) Filed: Sep. 4, 2019

(65) Prior Publication Data
US 2021/0064611 A1 Mar. 4, 2021

(51) Int. Cl.
*G06F 16/242* (2019.01)
*G06F 16/28* (2019.01)
*G06F 3/0482* (2013.01)

(52) U.S. Cl.
CPC ........ *G06F 16/2428* (2019.01); *G06F 3/0482* (2013.01); *G06F 16/287* (2019.01)

(58) Field of Classification Search
CPC ... G06F 16/2428; G06F 16/287; G06F 3/0482
See application file for complete search history.

(56) References Cited

U.S. PATENT DOCUMENTS

| 5,644,740 | A * | 7/1997 | Kiuchi | G06F 16/3323 |
| | | | | 715/854 |
| 9,830,630 | B2 * | 11/2017 | Chen | G06Q 30/0643 |
| 10,043,109 | B1 * | 8/2018 | Du | G06N 3/08 |
| 10,353,893 | B2 * | 7/2019 | Teodorescu | G06F 40/174 |
| 10,664,515 | B2 * | 5/2020 | Sacheti | G06F 16/248 |
| 10,824,942 | B1 * | 11/2020 | Bhotika | G06F 16/56 |
| 2005/0160014 | A1 * | 7/2005 | Moss | G06Q 30/0259 |
| | | | | 705/26.61 |
| 2007/0226640 | A1 * | 9/2007 | Holbrook | G06F 16/951 |
| | | | | 715/765 |

(Continued)

*Primary Examiner* — Daeho D Song
(74) *Attorney, Agent, or Firm* — Shook, Hardy & Bacon L.L.P.

(57) ABSTRACT

Methods, systems, and computer storage media for processing search queries using item-based search refinement are provided. In response to a search query, search result items are displayed on a search interface. The search result items each have an associated item-specific control having embedded selectable hierarchical category classifications. Upon selecting an item-specific control, the item-specific control is displayed. A selection of an embedded hierarchical category classification is received to cause execution of an embedded-item search operation. An embedded-item search operation is executed to identify a subset of the items using the selected hierarchical category classification. The associated item-specific control further has embedded selectable attributes. A selection of an embedded attribute is further received to cause execution of the embedded-item search operation. The embedded-item search operation is executed to identify a subset of the items using the selected hierarchical category classification and the selected attribute.

20 Claims, 13 Drawing Sheets

(56) References Cited

U.S. PATENT DOCUMENTS

| | | | |
|---|---|---|---|
| 2009/0132340 A1* | 5/2009 | Demir | G06Q 30/02 |
| | | | 705/7.29 |
| 2009/0171813 A1* | 7/2009 | Byrne | G06Q 30/0623 |
| | | | 707/999.005 |
| 2010/0076952 A1* | 3/2010 | Wang | G06F 16/951 |
| | | | 707/706 |
| 2012/0290978 A1* | 11/2012 | Devecka | G06Q 30/0273 |
| | | | 715/810 |
| 2015/0088693 A1* | 3/2015 | Moore | H04L 67/2838 |
| | | | 705/26.61 |
| 2018/0181569 A1* | 6/2018 | Jarr | G06F 16/5838 |
| 2018/0336415 A1* | 11/2018 | Anorga | G06K 9/6267 |
| 2019/0050427 A1* | 2/2019 | Wiesel | G06V 40/10 |
| 2019/0087887 A1* | 3/2019 | Westphal | G06Q 30/0641 |
| 2019/0138519 A1* | 5/2019 | Kavas | G06V 30/224 |
| 2019/0236083 A1* | 8/2019 | Tahara | G06F 16/287 |
| 2019/0266153 A1* | 8/2019 | Zhang | G06F 16/2428 |
| 2019/0286740 A1* | 9/2019 | Menipaz | G06F 16/248 |
| 2019/0317952 A1* | 10/2019 | Li | G06F 16/2246 |
| 2019/0318405 A1* | 10/2019 | Hu | G06Q 30/0625 |
| 2020/0201848 A1* | 6/2020 | Srinivasan | G06F 16/2246 |
| 2020/0285667 A1* | 9/2020 | Gupta | G06Q 30/0623 |
| 2020/0387536 A1* | 12/2020 | Uchida | G06Q 50/10 |

* cited by examiner

ITEM-SPECIFIC SEARCH CONTROLS IN A SEARCH SYSTEM

BACKGROUND

Users often rely on search systems to help find information stored on computer systems. Such search systems include search interfaces that provide options for refining search results. For example, a search system may provide standard search refinement features. Such standard search refinement features may include an overly inclusive set of attributes for use in filtering. With the ever-increasing use of search systems for retrieving electronically stored information, improvements in computing operations for search systems can provide more efficient refinement of search queries and other operations in search systems.

SUMMARY

Embodiments of the present invention relate to methods, systems and computer storage media for providing searching based on hierarchical category classifications of an item using an item-specific control that supports additional search functionality. By way of background, conventional query refinement operations in search systems may lead to inefficient search system refinement user interfaces ("search refinement interface") because the options provided may be an overly inclusive set of category options that may be used for filtering. The overly inclusive set of category options do not adequately identify refinement attributes related to a specific item in search user interface. For example, standard refinement user interface features may be a set of all the categories related to all the items provided as search result items (i.e., an entire set of categories corresponding to search result items that have a subsets of unrelated items). Moreover, a user has to have special knowledge of how items are listed in relation to categories to be able to search for the item. As such, an alternative approach for providing search interfaces to support efficient search for items in an item listing database would improve computing operations for ease of performing searches.

Embodiments of the present disclosure are directed towards improving search systems using item-based search refinement. In particular, item-based search refinement is provided using an item-specific control (i.e., a user interface control object) having embedded selectable hierarchical category classifications. At a high level, an item-specific control may be provided in association with each item identified as a search result item. Upon selecting an item-specific control associated with an item of interest, the item-specific is displayed. The item-specific control includes hierarchical category classifications such that a user can quickly select at least one of the hierarchical category classifications for use in refining search result items. A selection of an embedded hierarchical category classification can be received to cause execution of an embedded-item search operation. In one example, an embedded-item search operation can be executed to identify a subset of the search result items using the selected hierarchical category classification. Accordingly, refinement user interfaces of embodiments of the present disclosure support efficient refinement of search result items in an item listing database and improve computing operations for ease of performing search refinement, as described herein.

Alternatively, in another example, item-based search refinement is provided using an item-specific control (i.e., a user interface control object) having embedded selectable hierarchical category classifications and embedded selectable attributes. At a high level, an item-specific control may be provided in association with each item identified as a search result item. Upon selecting an item-specific control associated with an item of interest, the item-specific is displayed. The item-specific control includes hierarchical category classifications and attributes such that a user can quickly select at least one of the hierarchical category classifications and the attributes for use in refining search result items. A selection of an embedded hierarchical category classification and an embedded attribute can be received to cause execution of an embedded-item search operation. In one example, using the selected hierarchical category classification and the selected attribute, an embedded-item search operation can be executed to identify a subset of the search result items. Accordingly, refinement user interfaces in embodiments of the present disclosure support efficient refinement of items in an item listing database and improve computing operations for ease of performing search refinement, as described herein.

In operation, an image comprising an item is displayed on a search interface. The item has an associated an item-specific control embedded with selectable hierarchical category classifications. A selection of an embedded hierarchical category classification is received to cause execution of an embedded-item search operation. In further operation, an image comprising an item is displayed. An item-specific control is associated with the item. The item-specific control is embedded with selectable hierarchical category classifications and selectable attributes. Selecting a hierarchical category classification and an attribute initiates embedded-item search operations. The embedded-item search operations cause display of a plurality of search result items based on the embedded-item search operation comprising the hierarchical category classification and the attribute.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
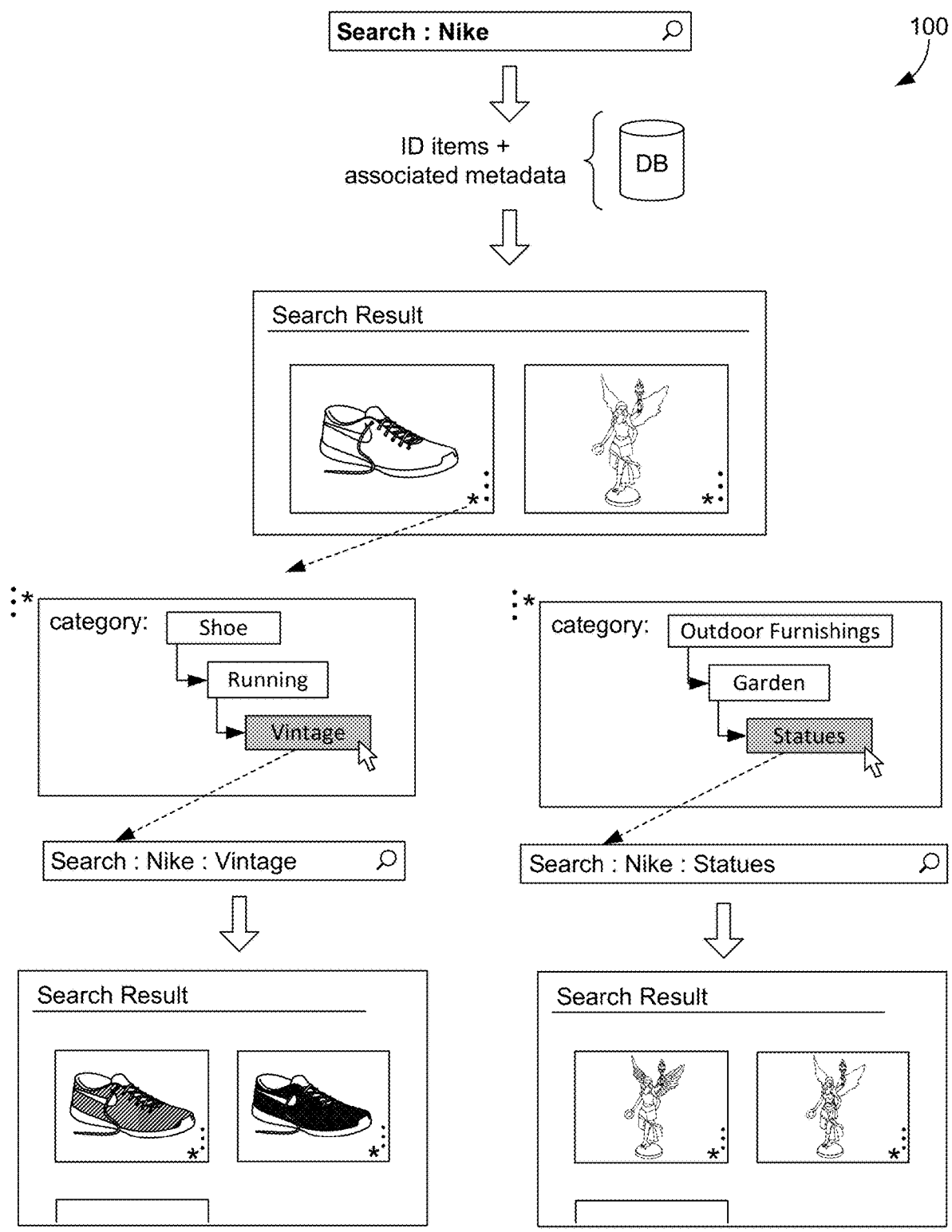
FIG. 1 is a block diagram of an exemplary search system with item-based search refinement, in which embodiments described herein may be employed.

Search systems support identifying, for received queries, search result items (e.g., products or content) from item databases. Item databases may specifically be for content platforms or product listing platforms such as EBAY item listing platform, developed by EBAY INC., of San Jose, Calif. Search systems may include search interfaces that provide search refinement functionality that is implemented to systematically browse the World Wide Web, typically for refining search results. For example, standard search refinement features may be used in a search system to refine search result items provided in response to a query.

In conventional search systems, search interfaces may provide standard search system refinement user interface ("search refinement interface") features. In particular, search refinement interface features may be a set of categories that are related to a set items provided as search result items (i.e., a list of all categories related to all returned search result items), a predefined set of attributes (i.e., a standard set of item characteristics) or a derived set of attributes (i.e., characteristics of all returned search result items). For example, all categories related to the set items (e.g., entire set of categories corresponding to a plurality of item provided as search result items), a predefined set of attributes (e.g., a color filter with a standard listing of colors, a size filter with a standard listing of sizes), or a derived set of attributes (e.g., entire set of attributes corresponding to a plurality of item provided as search result items) may be provided as standard search refinement features. However, such standard search refinement features (having all the categories, the predefined set of attributes, or a derived set of attributes from all search result items) leads to an inefficient interface because nothing immediately indicates which search refinement features correspond to a particular item, thus limiting how effectively the user can further filter or search via the interface.

Moreover, a user has to have special knowledge of listings in an item database or an item itself to be able to search for the item. For example, a user searches for "Nike" and a search engine identifies in search result items including NIKE shoes and statues of the Greek goddess Nike (e.g., gardening statues or collectables). Special knowledge of how an item of interest is categorized within the item database is required to perform additional operations. For search result items in the same category as the item of interest. For instance, a user would often have to perform several additional individual searches to identify additional Nike statues that are under the category "Home & Garden" which are different from Nike statues that are "Collectables." As another example, a user that identifies an image of Nike Shoes on the web would often have to perform several additional searches to find out the Nike Shoes have attributes. For example, the NIKE shoes may have upper material that is "Leather" and are also "Water Resistant." In this way, conventional search system interfaces ineffectively support providing refinement interfaces and fail to identify features that are specific to an item of interest to a user for performing searches. As such, an alternative approach for providing search interfaces to support efficient search for items in an item listing database would improve computing operations for ease of performing searches.

Embodiments of the present disclosure are directed to a search system with item-based search refinement. Item-based search refinement may be provided using a refinement user interface having selectable hierarchical category classifications specific to an item. At a high level, hierarchical category classifications are various levels of categories associated with an item. The selectable hierarchical category classifications are based on a category structure of items in an item listing database. The selectable hierarchical category classifications are displayed to provide additional search functionality (e.g., an item-specific control that may perform embedded-item search operations including refining existing search results or executing a new search). An item-specific control may be provided in association with an item. In particular, item-based search refinement may be provided using an item-specific control (i.e., a user interface control object) having embedded selectable hierarchical category classifications. The item-specific control may have hierarchical category classifications embedded in the control. The hierarchical category classifications are directly selectable from the item-specific control to initiate an item-specific search operation related to a selected hierarchical category classification. In this way, the selectable hierarchical category classifications may provide item-specific search refinement via integrated embedded-item search operation functionality using the selectable hierarchical category classifications in the control.

Item-based search refinement may further be provided using a refinement user interface having selectable attributes specific to an item. In particular, the attributes can be selected along with hierarchical category classifications in an item-specific control to support additional search functionality. By way of example, the, attributes are an identified set of characteristics associated with a specific item. Such a set of characteristics may be provided by a user (e.g., the user posting the item) or may be provided based on the item listing (e.g., title or keywords). The selectable attributes are displayed to provide the additional search functionality (e.g., an item-specific control that can support embedded-item search operations including refining existing search results or executing a new search). For instance, the selectable attributes are displayed along with the hierarchical category classifications in an item-specific control for an item. The item-specific control includes the hierarchical category classifications and attributes embedded in the control such that hierarchical category classifications and the attributes are both directly selectable to initiate an item-specific search operation related to a selected attribute and a hierarchical category classification. In this way, the selectable hierarchical category classifications and attributes may provide item-specific search refinement via integrated embedded-item search operation functionality using the selectable hierarchical category classifications and attributes in the control.

Item-based search refinement may further provide additional types of embedded item searching functionality specific to an item in an item-specific control for an item. As discussed above, the item-specific control can include embedded selectable hierarchical category classifications and embedded selectable attribute specific to the item. The item-specific control can further include embedded selectable image-based search options and embedded selectable watch options specific to the item. Image-based searching can be performed as an embedded-item search operation utilizing computer vision services based on the image of an item. For example, visual attributes of an item can be used to identify similar/same items available in the item database (e.g., same/similar Nike statues). "Watch" can be performed as an embedded-item search operation to automatically add the item to a user's watch list (i.e., for watching the specific item). As such, an item-specific control can provide item-based search refinement related to a specific item of interest.

Initially, selectable hierarchical category classifications may be provided for item-based search refinement. Hierarchical category classifications may be identified based on categories associated with an item. For instance, the hierarchical category classifications may be various levels of categories associated with an item (e.g., item in an item listing database). The levels of categories may generally relate to hierarchically-ranked classifications of an item (e.g., high-level category, mid-level category, low-level category). Hierarchically-ranked classifications may be based on a category structure of items in an item listing database. For example, the category structure may include major categories (i.e., a high-level category), sub-categories (i.e., mid-level category), sub-sub-categories (i.e., low-level category), etc. As an example, in the major category "Clothing, Shoes & Accessories" there are sub-categories "Women's Clothing," "Men's Shoes," "Jewelry," and so on. Each of these sub-categories can have further sub-categories (e.g., sub-sub-categories). For example, the sub-category "Men's Shoes" may have further sub-categories "Athletic Shoes," "Boots," "Dress Shoes," etc. Hierarchical category classifications may be automatically or manually associated with an item based on characteristics of the item. For example, an item—red leather NIKE running shoes—may have hierarchical category classifications "Clothing, Shoes & Accessories," with the sub-category "Men's Shoes" with the further sub-category "Athletic Shoes." As another example, red leather NIKE running shoes may have hierarchical category classifications "Shoes," with the sub-category "Running Shoes" with the further sub-category "Vintage."

One or more selectable hierarchical category classifications may be provided via a refinement user interface for item-based search refinement based on the hierarchical category classifications identified for a specific item returned in relation to a search query. In particular, item-based search refinement may be provided using an item-specific control having embedded selectable hierarchical category classifications. The item-specific control may include hierarchical category classifications of an item such that a user may quickly select at least one of the hierarchical category classifications for use in refining search results. A user may use the item-specific control to initiate additional embedded-item search operation functionality. In particular, the item-specific control includes hierarchical category classifications that are directly selectable to initiate an embedded-item search operation. For example, for a search query "Nike," returned items can include NIKE running shoes and Greek goddess Nike garden statues. Each item can have an associated item-specific control having embedded selectable hierarchical category classifications related to the specific item. Such item-specific controls may be presented in a collapsed form that can be expanded upon user selection. In particular, a user may select (e.g., expand) an item-specific control having embedded selectable hierarchical category classifications for an item of interest. The item-specific control may include selectable hierarchical category classifications that relate to the item. For instance, NIKE running shoes can have one set of hierarchical category classifications (e.g., "Shoe," "Running," "Vintage") and the Greek goddess Nike garden statue can have another set of hierarchical category classifications (e.g., "Outdoor Furnishings," "Garden," "Statue"). Using the item-specific control of an item of interest, a user may select a hierarchical category classification (e.g., "Vintage" or "Statue") to execute an embedded-item search operation.

Executing an embedded-item search operation may identify a subset of the items using a selected hierarchical category classification. For example, selecting a hierarchical category classification (e.g., "Vintage") may execute an embedded-item search operation to provide a subset of "Vintage" items (e.g., vintage running shoes). Executing the embedded-item search operation may also provide a dynamically updatable count of items that will be provided upon refinement using the selected hierarchical category classification. For example, selecting a hierarchical category classification (e.g., "Vintage") may execute an embedded-item search operation to provide a dynamically updatable count of items that are "Vintage" (e.g., 10 vintage running shoes). In this way, the item-specific control supports item-based search refinement while integrating embedded-item search operation functionality using the selectable hierarchical category classifications in the control.

Further, selectable attributes may be provided along with the selectable hierarchical category classifications for item-based search refinement. The attributes are an identified set of characteristics associated with a specific item. Such a set of characteristics may be provided by a user (e.g., the user posting the item) or may be provided based on the item listing (e.g., title or keywords). For instance, the attributes may be characteristics or features associated with an item (e.g., item in an item listing database). For example, an item—red leather NIKE running shoes—may have attributes "Red," "Leather," "NIKE."

One or more selectable attributes may be provided via a refinement user interface for item-based search refinement based on the attributes identified for a specific item returned in relation to a search query. In particular, item-based search refinement may be provided using an item-specific control having embedded selectable attributes (along with the embedded selectable hierarchical category classifications). The item-specific control may include hierarchical category classifications and attributes of an item such that a user may quickly select at least one of the hierarchical category classifications or attributes for use in refining search results.

A user may use the item-specific control to initiate additional embedded-item search operation functionality. In particular, the item-specific control includes hierarchical category classifications and attributes that are directly selectable to initiate an embedded-item search operation. For example, for a search query "Nike," returned items can include NIKE running shoes and Greek goddess Nike garden statues. Each item can have an associated item-specific control having embedded selectable hierarchical category classifications and embedded selectable attributes related to the specific item.

Such item-specific controls may be presented in a collapsed form that can be expanded upon user selection. In particular, a user may select (e.g., expand) an item-specific control having embedded selectable hierarchical category classifications and embedded selectable attributes for an item of interest. The item-specific control may include selectable hierarchical category classifications and selectable attributes that relate to the item. For instance, NIKE running shoes can have one set of hierarchical category classifications (e.g., "Shoe," "Running," "Vintage") and attributes (e.g., "Red," "Leather," "NIKE") and the Greek goddess Nike garden statue can have another set of hierarchical category classifications (e.g., "Outdoor Furnishings," "Garden," "Statue") and attributes (e.g., "Gold," "Plaster," "8 inches"). Using the item-specific control of an item of interest, a user may select a hierarchical category classification (e.g., "Vintage" or "Statue") and an attribute (e.g., "Leather" or "Plaster") to execute one or more embedded-item search operations.

Executing an embedded-item search operation may identify a subset of the items using a selected hierarchical category classification and selected attribute. For example, selecting a hierarchical category classification (e.g., "Vintage") and an attribute (e.g., "Leather") may execute an embedded-item search operation to provide a subset of "Vintage" and "Leather" items (e.g., vintage leather running shoes). Executing the embedded-item search operation may also provide a dynamically updatable count of items that will be provided upon refinement using the selected hierarchical category classification. For example, hierarchical category classification (e.g., "Vintage") and an attribute (e.g., "Leather") may execute an embedded-item search operation to provide a dynamically updatable count of items that are "Vintage" and "Leather" (e.g., 3 vintage leather running shoes). In this way, the item-specific control supports item-based search refinement while integrating embedded-item search operation functionality using the selectable hierarchical category classifications and selectable attributes in the control.

In operation, items may be displayed on webpage (in response to a search query). Each item may have an item-specific control. Upon activating an item-specific control for an item, the item-specific control having embedded selectable hierarchical category classifications may be displayed. A selection of a hierarchical category classification may cause execution of an embedded-item search operation. The embedded-item search operation may identify a subset of the items using the selected hierarchical category classification. The embedded-item search operation may also provide a dynamically updatable count of items that will be provided upon refinement using the selected hierarchical category classification.

In further operation, items may be displayed on a webpage (e.g., in response to a search query). Each item may have an item-specific control. Upon activating an item-specific control for an item, the item-specific control having embedded selectable hierarchical category classifications and embedded selectable attributes may be displayed. Selection of a hierarchical category classification and an attribute may cause execution an embedded-item search operation. The embedded-item search operation may identify a subset of the items using the selected hierarchical category classification and the selected attribute. The embedded-item search operation may also provide a dynamically updatable count of items that will be provided upon refinement using the selected hierarchical category classification and attribute.

Embodiments of the present disclosure have been described with reference to several inventive features associated with a search system with item-based search refinement. Inventive features described include providing an item-specific control with selectable hierarchical category classifications for item-based search refinement. Item-based search refinements integrated embedded-item with search operation functionality using selectable hierarchical category classifications in the control. Further inventive features described include identifying and providing selectable attributes along with the hierarchical category classifications for additional item-based search refinement operations (e.g., image-based search operations and embedded selectable watch operations). Functionality of the embodiments of the present disclosure have further been described, by way of an implementation and anecdotal examples. The implementations and anecdotal examples demonstrate that the operations for item-based search refinement are an unconventional ordered combination of operations that operate as a solution to a specific problem in search technology environment to improve computing operations in search systems. Overall, these improvements result in less CPU computation, smaller memory requirements, and increased flexibility in search systems.

With reference to FIG. 1, FIG. 1 illustrates an exemplary search system 100 in which implementations of the present disclosure may be employed. In particular, FIG. 1 shows high level functionality of search system 100. The search system 100 may provide item-based search refinement. The search system 100 may receive search queries. The search query may indicate an item or item type. For example, as depicted, the search query may be "Nike." In response to receiving a search query, the search system 100 may identify a set of items for the search query in an item database. For the search query, "Nike," a set of NIKE shoes and Nike statues may be identified in the item database. In response to receiving a search query, the search system 100 may also identify metadata associated with the identified set of items. For the search query, "Nike," metadata (e.g., hierarchical category classifications, attributes, etc.) related to the set of NIKE shoes and Nike statues may be identified. The identified set of items may be presented (e.g., via a user interface).

Each item in the identified set of items may have an associated item-specific control. An item-specific control of an item may be selected to cause the presentation of the item-specific control. As depicted, an item-specific control has embedded selectable hierarchical category classifications. The item-specific control may provide item-based search refinement based on selected hierarchical category classifications via the control. Selecting hierarchical category classifications may cause an execution of embedded-item search operations. Though not depicted, the item-specific control may provide further embedded selectable options (e.g., attributes, image search, watch, etc.).

For one item, the NIKE shoe, an item-specific control can be presented. The item-specific control has embedded selectable hierarchical category classifications: "Shoe" "Running" and "Vintage." A hierarchical category classification can be selected (e.g., "Vintage"). This selection may result in an embedded-item search operation to identify a subset of items that have the selected hierarchical category classification from the identified set of items (e.g., identify the subset of items that are classified as "Vintage" from the identified set of items from the initial search "Nike"). Such a classification may be in line with the hierarchical category levels (e.g., selecting "Vintage" is under the hierarchy of categories "Shoe" and "Running").

For another item, the Nike statue, an item-specific control can be presented. The item-specific control has embedded selectable hierarchical category classifications: "Outdoor Furnishings" "Garden" and "Statue." A hierarchical category classification can be selected (e.g., "Statue"). This selection may result in an embedded-item search operation to identify a subset of items that have the selected hierarchical category classification from the identified set of items (e.g., identify the subset of items that that are classified as "Statue" from the identified set of items from the initial search "Nike"). Such a classification may be in line with the hierarchical category levels (e.g., selecting "Statue" is under the hierarchy of categories "Outdoor Furnishings" and "Garden").

Such examples of item-based search refinement by selecting hierarchical category classifications via the item-specific control may be combined with further item-based search refinement options. As one example, further item-based search refinement options can include a refinement user interface having selectable attributes specific to an item (e.g., item-specific control with embedded selectable attributes specific to an item). As another example, further item-based search refinement options can include a refinement user interface having selectable image-based searching specific to an item (e.g., item-specific control with embedded selectable image-based searching specific to an item). As an additional example, further item-based search refinement options can include a refinement user interface having a selectable "Watch" (i.e., watch this item) specific to an item (e.g., item-specific control with embedded selectable "Watch" specific to an item). In this way, the item-specific control supports item-based search refinement while integrating embedded-item search operation functionality using selectable hierarchical category classifications in the control.

Figure 2A:
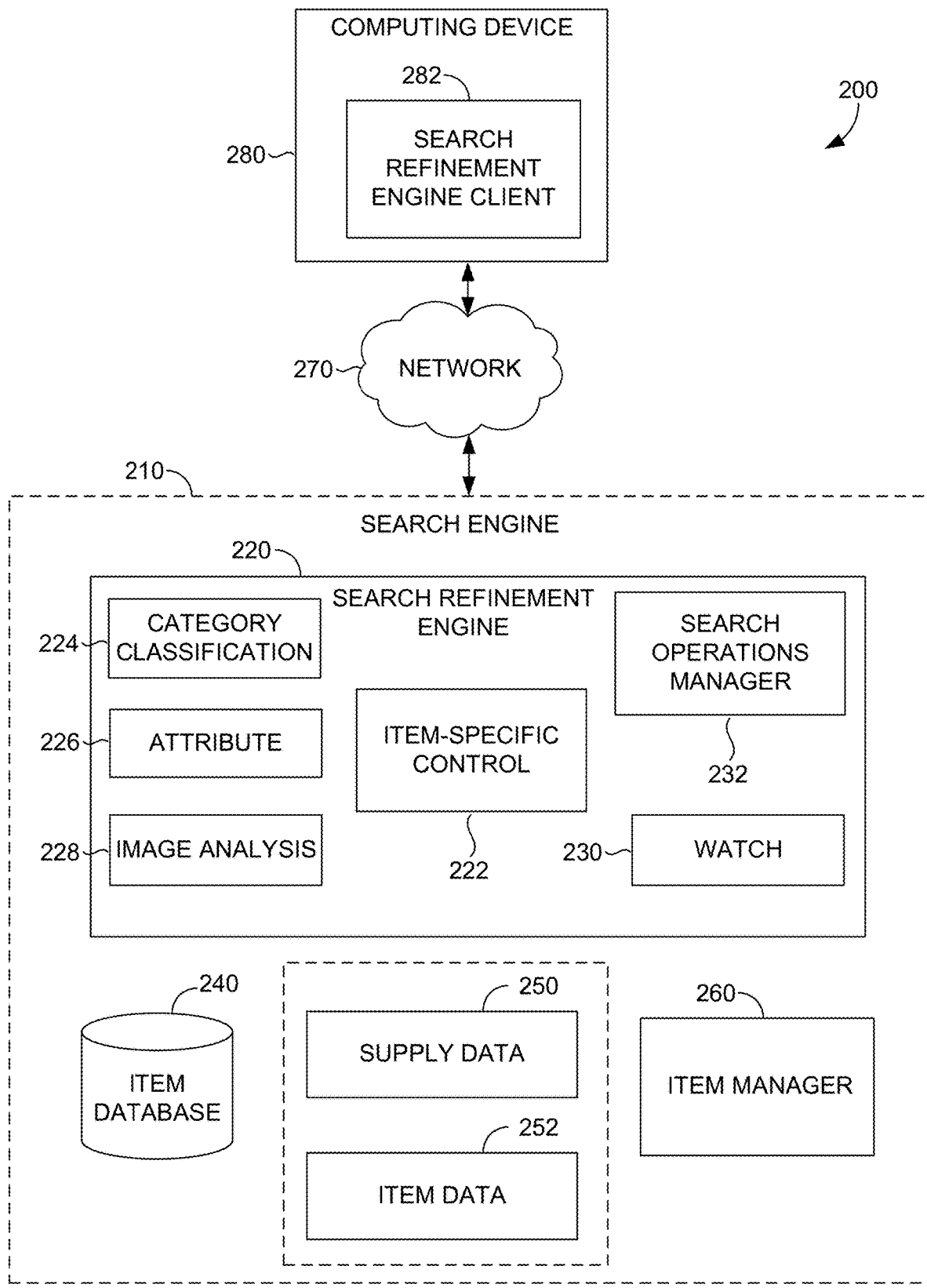
FIGS. 2A-2D are block diagrams of an exemplary search system with item-based search refinement, in which embodiments described herein may be employed.

With reference to FIG. 2A, FIG. 2A illustrates an exemplary search system 200 in which implementations of the present disclosure may be employed. In particular, FIG. 2A shows a high level architecture of search system 200 having components in accordance with implementations of the present disclosure. Among other components or engines not shown, search system 200 includes a computing device 280. The computing device 280 includes search refinement engine client 282. The computing device 280 communicates via a network 270 and with a search engine 210. The search engine 210 includes search refinement engine 220 having item-specific control 222, category classification 224, attribute 226, image analysis 228, watch 230, search operations manager 232, item database 240, supply data 250, item data 252, and item manager 260. Each of the identified components may represent a plurality of different instances of the component, for example, category classification 224 may be various category classifications (e.g., hierarchical category classifications) and attribute 226 may be various attributes, as described below. The components of the search system 200 may communicate with each other over one or more networks (e.g., public network or virtual private network "VPN") as shown with network 270. The network 270 may include, without limitation, one or more local area networks (LANs) and/or wide area networks (WANs). The computing device 280 may be a client computing device that corresponds to the computing device described herein with reference to FIG. 8.

The components of the search system 200 may operate together to provide functionality for item-based search refinement, as described herein. In particular, the item-based search refinement may use an item-specific control having embedded selectable hierarchical category classifications. As discussed, the search system 200 supports processing operation requests (e.g., search queries, search refinement, other search system requests from the computing device 280). For example, query results for a search query from the search system may include identified items as well as additional relevant information, where the additional external information (e.g., category classifications and attributes) may be identified by the item manager 260 and provided via search refinement engine 220.

The search engine 210 is responsible for supporting operations for providing search refinement as described herein. The search engine 210 in the search system 200 may access items in an item listing platform. The search engine 210 may be part of an item listing platform that supports access to the item database 240. The items in the item database may be stored based on a data structure having a structural arrangement of items (e.g., an item category and an item classification system). For example, the item database 240 may be implemented with a database schema that stores item listings based on item titles. Available items in the item database 240 may be identified using, for example, supply data 250. Supply data 250 may include information related to item database 240. For example, the supply data 250 may include items available in the item database 240.

The item manager 260 manages item information that may be used by the search system 200. Item information may be associated with supply data 260 for items identified in a search (e.g., items available in the item database 240). Item data 252 may generally relate to associated item information (e.g., for the items identified using supply data 250). Associated item information may comprise hierarchical category classifications related to an item. Associated item information may further comprise attributes related to an item. For instance, when the item is a shoe, associated item information can be based on metadata related to the shoe such as hierarchical category classifications and attributes. As a non-limiting example, a pair of shoes may have hierarchical category classifications "Shoe," "Running," and "Vintage" along with attributes that include "Leather," "Red," and "NIKE," respectively.

The search refinement engine 220 supports item-based search refinement by implementing category classification 224 in accordance with the search system 200. Category classification 224 may leverage various levels of categories associated with items identified by the item manager 260 in relation to a search query. In particular, the category classification 224 supports providing selectable hierarchical category classification(s). One or more hierarchical category classifications may be presented based on the categories identified for items identified in relation to a search query. For example, for search query "Nike," categories for one identified item may include hierarchical category classifications, "Shoe," "Running," and "Vintage" and categories for another identified item may include hierarchical category classifications, "Outdoor Furnishings," "Garden," and "Statues."

In particular, the search refinement engine 220 supports item-based search refinement by implementing the item-specific control 222 in accordance with the search system 200. The item-specific control 222 supports providing embedded selectable hierarchical category classifications that initiate embedded-item search operations. The item-specific control 222 may be presented upon selection to expand the item-specific control. In this way, the item-specific control 222 supports providing embedded selectable hierarchical category classifications. The embedded selectable hierarchical category classifications provided via the item-specific control 222 may be provided by category classification 224. Such embedded selectable hierarchical category classifications may be various levels of categories associated with item identified by the item manager 260 in relation to a search query, as discussed above. For example, for search query "Nike," selectable hierarchical category classifications may include "Shoe," "Running," and "Vintage" and for another identified item selectable hierarchical category classifications may include may include, "Outdoor Furnishings," "Garden," and "Statues." Selecting a hierarchical category classification via the item-specific control 222 may initiate an embedded-item search operation.

The search refinement engine client 282 operates with the search refinement engine 220 to provide the functionality as described herein (i.e., item-based search refinement). In particular, the search refinement engine client 282 may implement the presentation of a refinement user interface having selectable hierarchical category classifications. Such selectable hierarchical category classifications may be provided using the item-specific control 222. Receiving a selection of an item-specific control of an item may cause a presentation of a refinement user interface (e.g., the item-specific control) having embedded selectable hierarchical category classifications. Such embedded selectable hierarchical category classifications may be provided using the category classification 224 in conjunction with the item-specific control 222. Receiving a selection of an embedded selectable hierarchical category classification may initiate embedded-item search operations.

Figure 2B:
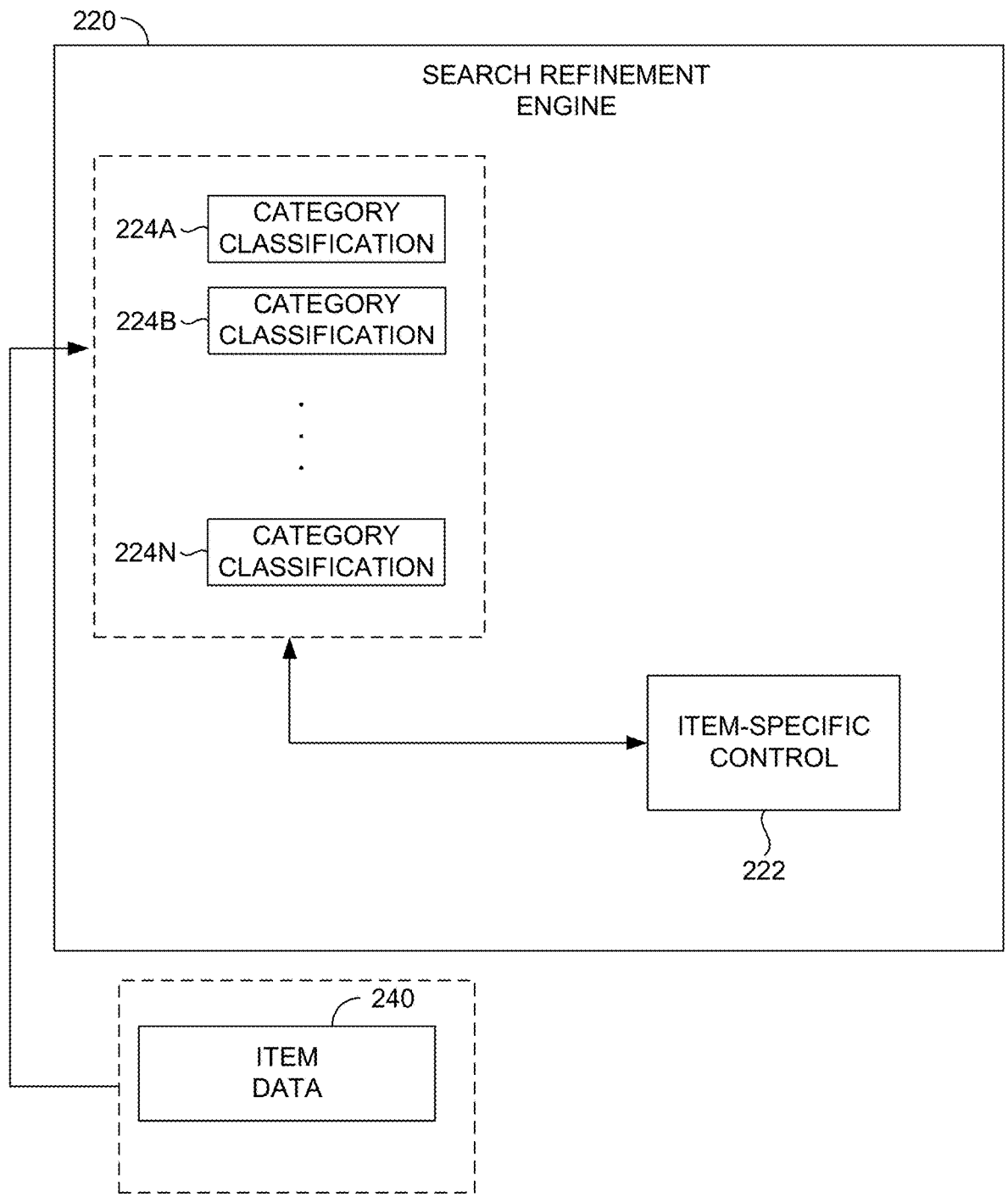

With reference to FIG. 2B, FIG. 2B illustrates search refinement engine 220 with components that support search refinement using embedded-item search operations. The embedded-item search operations may be performed based on a selected hierarchical category classification (i.e., category classification 224A, category classification 224B, . . . , and category classification 224N). In particular, one or more hierarchical category classifications (i.e., category classification 224A, category classification 224B, . . . , and category classification 224N) may be selected via item-specific control 222 to implement an embedded-item search operation. The item-specific control 222 is provided upon selection (e.g., an item-specific control may be presented in a collapsed form that can be expanded upon user selection). The hierarchical category classification(s) is provided based on item data 252 (e.g., indicating associated item information for available items in item database 240).

Figure 2C:
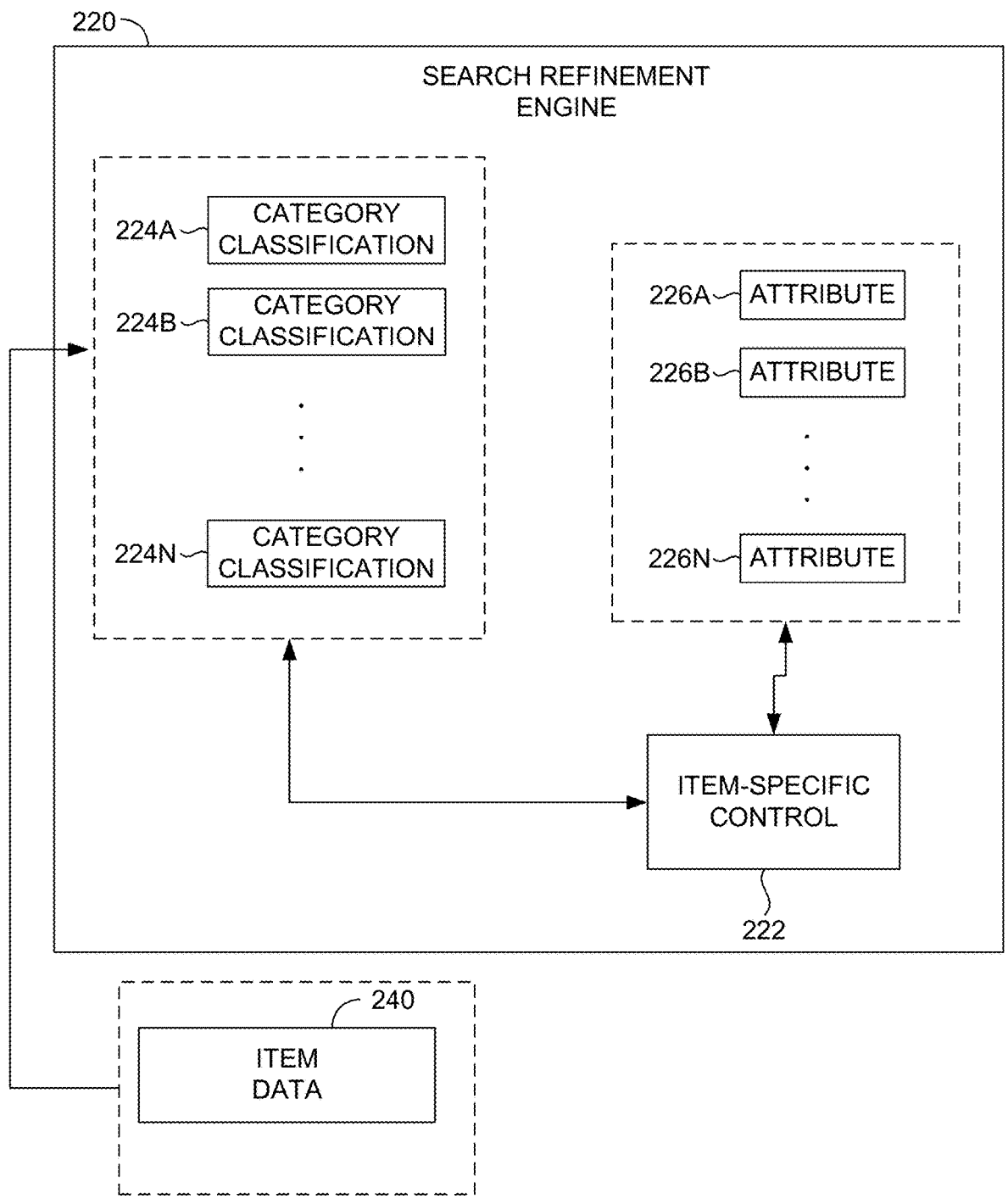

With reference to FIG. 2C, FIG. 2C illustrates search refinement engine 220 with components that support search refinement using embedded-item search operations. The embedded-item search operations may be performed based on a selected hierarchical category classification (i.e., category classification 224A, category classification 224B, . . . , and category classification 224N) and on a selected attribute (i.e., attribute 226A, attribute 226B, . . . , and attribute 226N). In particular, one or more hierarchical category classifications (i.e., category classification 224A, category classification 224B, . . . , and category classification 224N) and one or more attribute(s) (i.e., attribute 226A, attribute 226B, . . . , and attribute 226N) may be selected via item-specific control 222 to implement an embedded-item search operation. The item-specific control 222 is provided upon selection (e.g., an item-specific control may be presented in a collapsed form that can be expanded upon user selection). The hierarchical category classification(s) and attribute(s) are provided based on item data 252 (e.g., indicating associated item information for available items in item database 240).

Figure 2D:
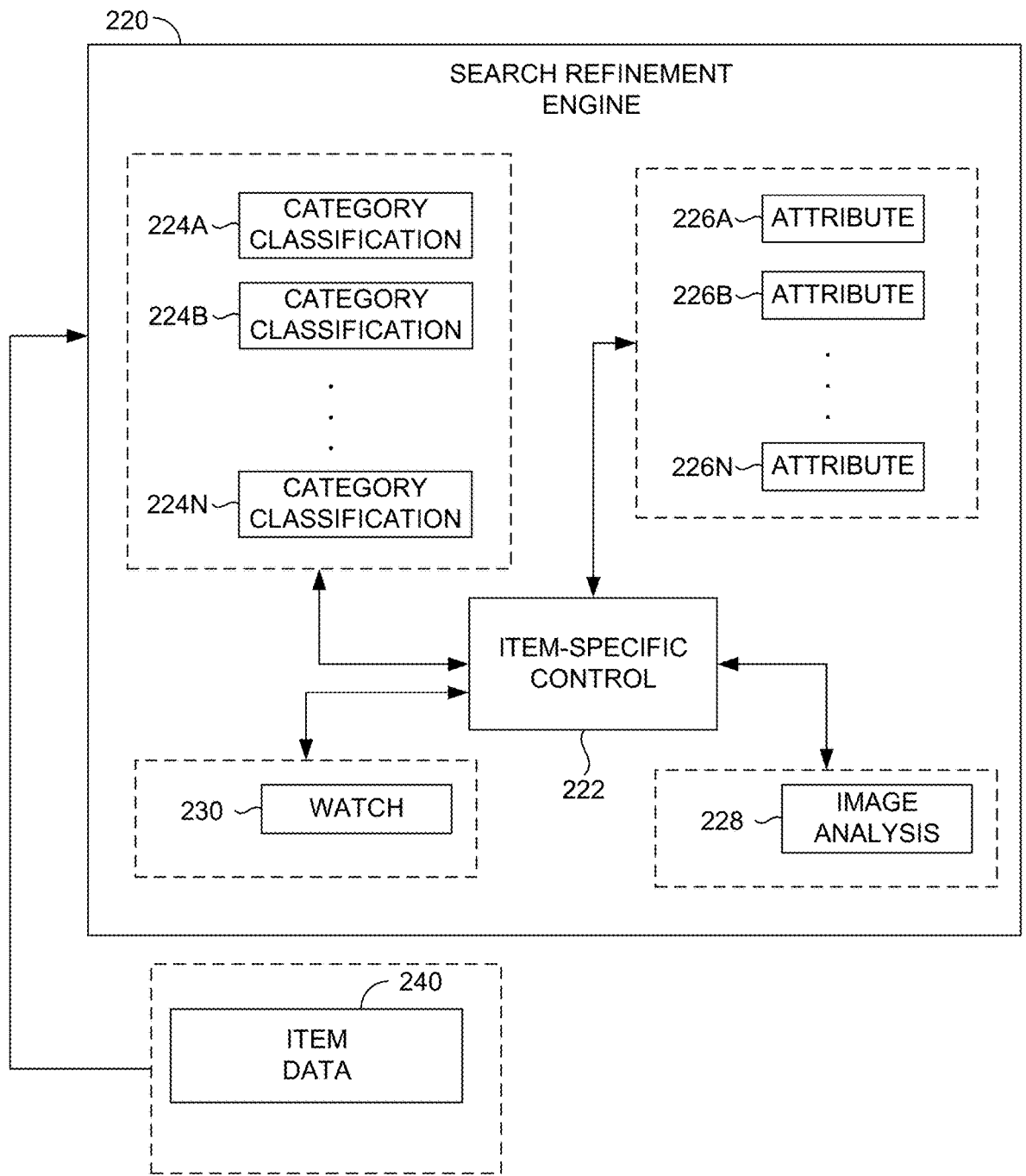

With reference to FIG. 2D, FIG. 2D illustrates search refinement engine 220 with components that support search refinement using embedded-item search operations. The embedded-item search operations may be performed based on a selected hierarchical category classification (i.e., category classification 224A, category classification 224B, . . . , and category classification 224N), on a selected attribute (i.e., attribute 226A, attribute 226B, . . . , and attribute 226N), on a selected image analysis (i.e., image analysis 228), or on a selected watch option (i.e., watch 230). In particular, one or more hierarchical category classifications (i.e., category classification 224A, category classification 224B, . . . , and category classification 224N), one or more attribute(s) (i.e., attribute 226A, attribute 226B, . . . , and attribute 226N), an image analysis (i.e., image analysis 228), or a watch option (i.e., watch 230) may be selected via item-specific control 222 to implement one or more embedded-item search operations. The item-specific control 222 is provided upon selection (e.g., an item-specific control may be presented in a collapsed form that can be expanded upon user selection). The hierarchical category classification(s) and attribute(s) are provided based on item data 252 (e.g., indicating associated item information for available items in item database 240). The image analysis can be performed using image-based searching utilizing computer vision services based on the image of the item. The watch option can be performed to automatically add the item to a user's watch list.

Figure 3A:
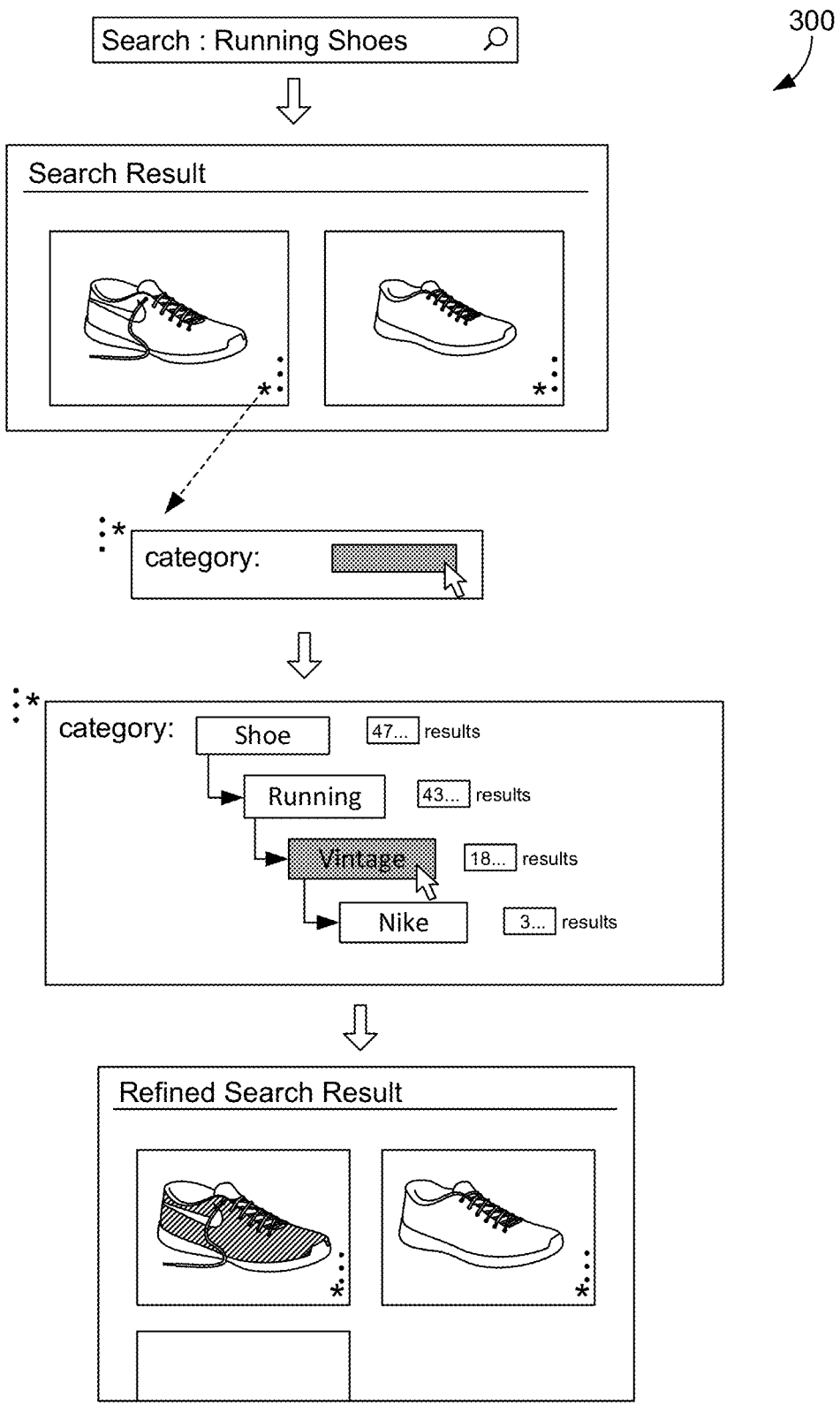
FIGS. 3A-3C are exemplary implementations of a search system with item-based search refinement, in which embodiments described herein may be employed.
Figure 3B:
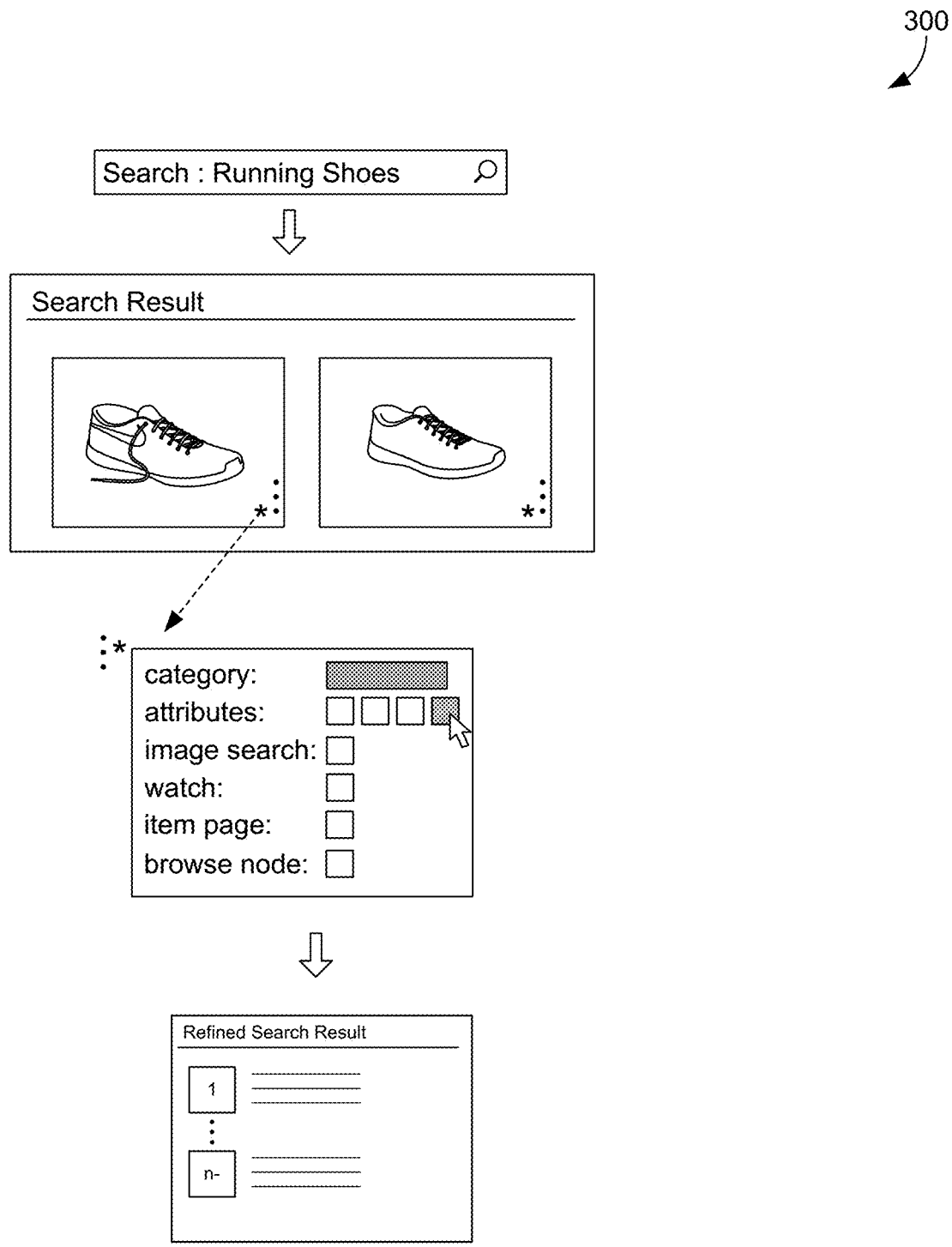
Figure 3C:
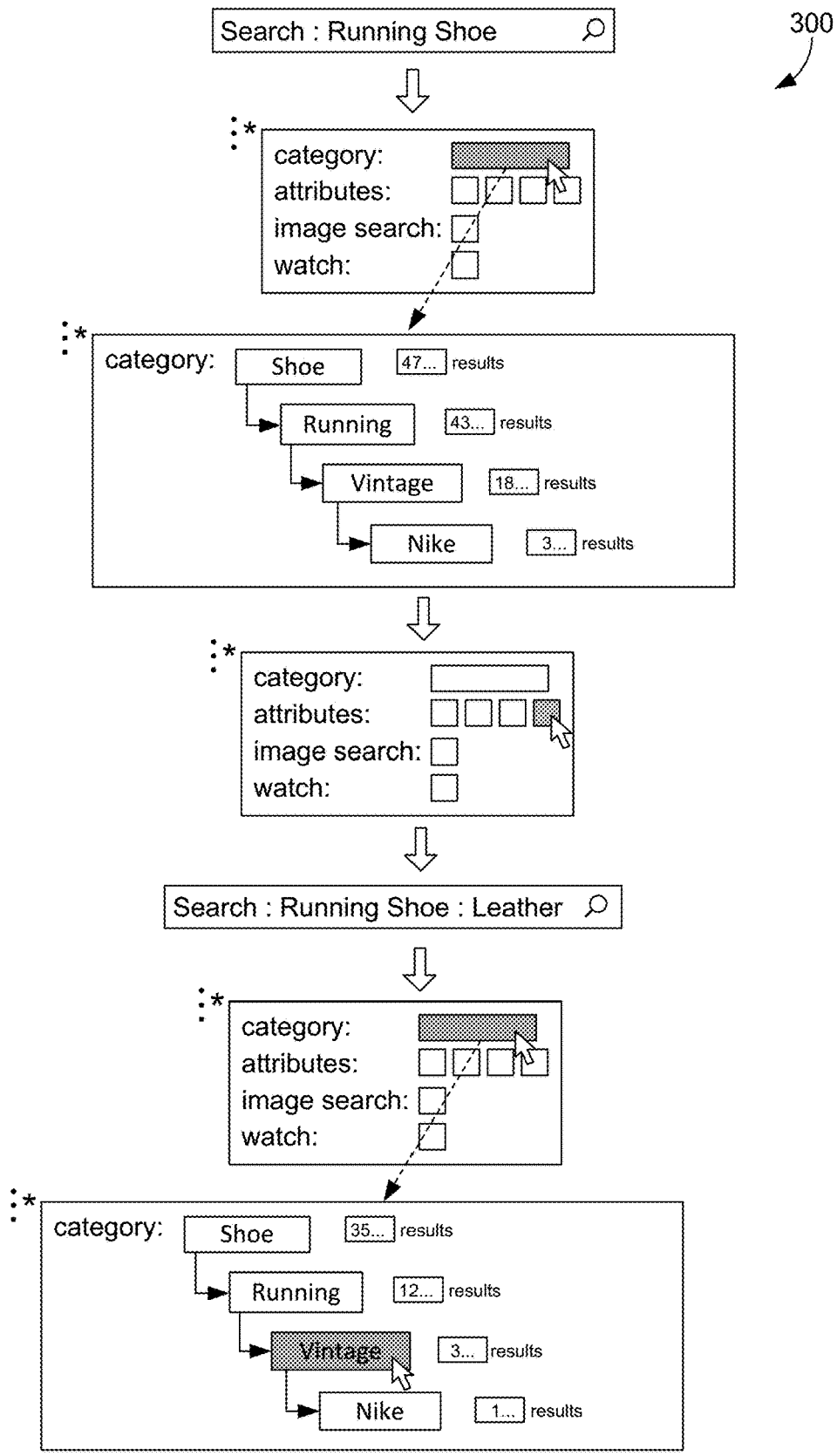

With reference to FIGS. 3A-3C, example implementations are provided of a search system having item-based search refinement. The example implementations may be performed using the search system described herein. In embodiments, the item-based search refinement may be provided using an item-specific control (i.e., a user interface control object) having embedded selectable hierarchical category classifications.

Turning to FIG. 3A, an example implementation is provided of a search system having item-based search refinement. In particular, in FIG. 3A search system 300 may provide item-based search refinement via a triggered item-specific control that supports item-based search refinement via integrated embedded-item search operation functionality using selectable hierarchical category classifications in the control. The search system 300 may receive a search query, "Running Shoes." In response to receiving a search query, the search system 300 may identify a set of items in an item database. The identified set of items may be presented via a user interface. Each item in the identified set of items may have an associated item-specific control. An item-specific control may be selected for presentation.

Selection of the item-specific control causes presentation of the item-specific control. The item-specific control may be presented as a partial overlay that comprises a user-interface element that indicates the embedded item-specific control is active and the items responsive to the initial search query are inactive. The item-specific control may have embedded selectable hierarchical category classifications. The embedded selectable hierarchical category classifications may be various levels of categories associated with an item (e.g., based on a category structure of items in an item listing database). A hierarchical category classification may be selected (i.e., "Vintage"), resulting in an embedded-item search operation to identify a subset of items from the identified set of items that have the selected hierarchical category classification (e.g., the subset of items that are "Vintage" from the identified set of items from the initial search "Running Shoes"). The item-specific control may also provide a dynamically updatable count of items that will be provided upon refinement using the selected hierarchical category classification. For example, selecting a hierarchical category classification (e.g., "Vintage") may execute an embedded-item search operation to provide a dynamically updatable count of items that are "Vintage" (e.g., 18 vintage running shoes).

Turning to FIG. 3B, an example implementation is provided of a search system having item-based search refinement. In particular, in FIG. 3B search system 300 may provide item-based search refinement using a triggered item-specific control, the item-specific control supports item-based search refinement via integrated embedded-item search operation functionality using selectable hierarchical category classifications and attributes in the control. The search system 300 may receive a search query, "Running Shoes." In response to receiving a search query, the search system 300 may identify a set of items in an item database. The identified set of items may be presented via a user interface. Each item in the identified set of items may have an associated item-specific control. An item-specific control may be selected for presentation.

Selection of the item-specific control cause in the presentation of the item-specific control. The item-specific control may have embedded selectable hierarchical category classifications and embedded selectable attributes. The embedded selectable hierarchical category classifications may be various levels of categories associated with an item (e.g., based on a category structure of items in an item listing database). A hierarchical category classification and at least one attribute may be selected (i.e., "Vintage" and "Leather"), resulting in an embedded-item search operation to identify a subset of items from the identified set of items that have the selected hierarchical category classification and the selected attribute (e.g., the subset of items that are "Vintage" and "Leather" from the identified set of items from the initial search "Running Shoes"). The item-specific control can further include embedded selectable image-based searching specific to the item. Image-based searching can be performed as an embedded-item search operation utilizing computer vision services based on the image of an item. For example, visual attributes of an item can be used to identify similar/same items available in the item database (e.g., same similar Nike statues). The item-specific control may also have embedded selectable "Watch" for watching the specific item of interest. "Watch" can be performed as an embedded-item search operation by automatically adding the item to a user's watch list.

The item-specific control may include additional embedded selectable options. In particular, the additional embedded selectable options can provide functionality for item page searching specific to the item. For instance, the item-specific control may include an embedded selectable associated item page (e.g., associated product page). An associated item page can display common information (e.g., attributes) about an item (e.g., product) at the top of the page, the number of items available for purchase (e.g., in a database), and highlights about the best value available for that item, etc. The embedded selectable associated item page can be provided as a selectable option when an associated item page exists for an item. For example, an item page can exist for one item (e.g., an iPhone 8) but not for another item (e.g., a pair of Nike shoes). Selecting an embedded associated item page in the item-specific control can execute an embedded-item search operation by pivoting to the associated item page (e.g., loading the associated item page for viewing).

Further, the additional embedded selectable options in the item-specific control may provide functionality for browse node searching specific to the item. Such functionality may be provided using an embedded selectable related browse node. The embedded selectable related browse node can relate to search operation functionality for a page-based related browse node or search operation functionality for a filtering-based related browse node. A related browse node can be based on a predefined combination of search refinement options, where the search refinement options may be related to the item. For instance, a related browse node can be based on a category or a category plus a filter (e.g., aspect) related to the item. An example of such a page-based related browse node for a comic book (i.e., an item) can bring up a page related to the series that the comic book is published in (e.g., The Amazing Spider-Man). Another example of such a page-based related browse node for a camera (i.e., an item) can relate to loading a page related to the brand and type of camera (e.g., Canon Digital Camera). An example of filtering-based related browse node for a comic book (i.e., an item) can relate to filtering items of a current search based on the series that the comic book is published in (e.g., The Amazing Spider-Man). Another example of such a filtering-based related browse node for a camera (i.e., an item) can relate to filtering items of a current search based on the brand and type of camera (e.g., Canon Digital Camera). Selecting an embedded related browse node in the item-specific control can execute an embedded-item search operation by pivoting based on the related browse node (e.g., loading a page for viewing based on the related browse node and/or filtering based on the predefined combination of search refinement options related browse node).

Turning to FIG. 3C, an example implementation is provided of a search system having item-based search refinement. In particular, in FIG. 3C search system 300 may provide iterative item-based search refinement. The search system 300 may receive a search query, "Running Shoes." In response to receiving a search query, the search system 300 may identify a set of items in an item database. The identified set of items may be presented via a user interface. Each item in the identified set of items may have an associated item-specific control. A first item-specific control may be selected for presentation.

Selection of the first item-specific control cause in the presentation of the item-specific control. The first item-specific control may have embedded selectable hierarchical category classifications and embedded selectable attributes. The embedded selectable hierarchical category classifications may be various levels of categories associated with an item (e.g., based on a category structure of items in an item listing database). A hierarchical category classification may be viewed to determine the hierarchical category classifications of the item (i.e., "Shoe," "Running," "Vintage," and "Nike"). An attribute may be selected (i.e., "Leather"), resulting in an embedded-item search operation to identify a subset of items from the identified set of items that have the selected attribute (e.g., the subset of items that are "Leather" from the identified set of items from the initial search "Running Shoes"). From this subset of items, a second item-specific control may be selected for presentation.

Selection of the second item-specific control cause in the presentation of the second item-specific control. The second item-specific control may have embedded selectable hierarchical category classifications and embedded selectable attributes. The embedded selectable hierarchical category classifications may be various levels of categories associated with an item (e.g., based on a category structure of items in an item listing database). A hierarchical category classification may be viewed to determine the hierarchical category classifications of the item (i.e., "Shoe," "Running," "Vintage," and "Nike"). A hierarchical category classification may be selected (i.e., "Vintage"), resulting in an embedded-item search operation to identify a subset of items from the identified set of items that have the selected hierarchical category classification (e.g., the subset of items that are "Vintage" from the identified set of items from the second search "Leather" and "Running Shoes").

As depicted, the item-specific control can further include other embedded item-specific refinement options. The item-specific control can include an embedded selectable image-based searching specific to the item. Image-based searching can be performed as an embedded-item search operation utilizing computer vision services based on the image of an item. For example, visual attributes of an item can be used to identify similar/same items available in the item database (e.g., same similar Nike statues). The item-specific control may also have embedded selectable "Watch" for watching the specific item of interest. "Watch" can be performed as an embedded-item search operation by automatically adding the item to a user's watch list.

With reference to FIGS. 4, 5, 6, and 7, flow diagrams are provided illustrating methods for implementing a search system for providing item-based search refinement. The methods may be performed using the search system described herein. In embodiments, one or more computer storage media having computer-executable instructions embodied thereon that, when executed, by one or more processors, may cause the one or more processors to perform the methods in the search system.

Figure 4:
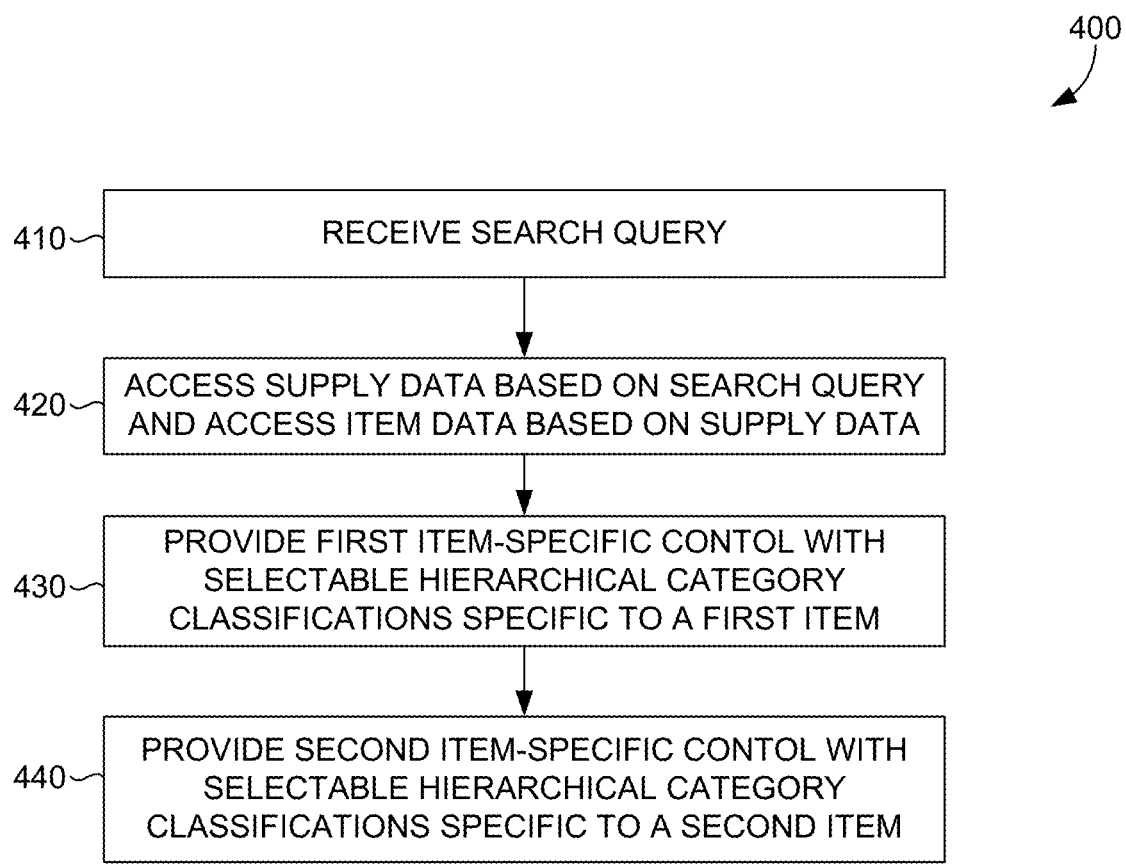
FIG. 4 is a flow diagram showing an exemplary method for implementing a search system with item-based search refinement, in accordance with embodiments described herein.

Turning to FIG. 4, a flow diagram is provided that illustrates a method 400 for implementing a search system for providing item-based search refinement using an item-specific control having embedded selectable hierarchical category classifications. Initially at block 410, a search query is received. The search query may indicate an item or item type. For example, the search query may be "Nike." At block 420, a supply data is accessed based on the search query and item data is accessed based on the supply data. Such supply data may include items available items in an item database. The item data may include associated item information for the available items. At block 430, a first item-specific control is provided. Such a first item-specific control may be provided in association with a first item identified for the search query. The first item-specific control provides embedded selectable hierarchical category classifications specific to the first item that initiate embedded-item search operations. At block 440, a second item-specific control is provided. Such a second item-specific control may be provided in association with a second item identified for the search query. The second item-specific control provides embedded selectable hierarchical category classifications specific to the second item that initiate embedded-item search operations. The embedded selectable hierarchical category classifications specific to the first item can be different from the embedded selectable hierarchical category classifications specific to the second item.

Figure 5:
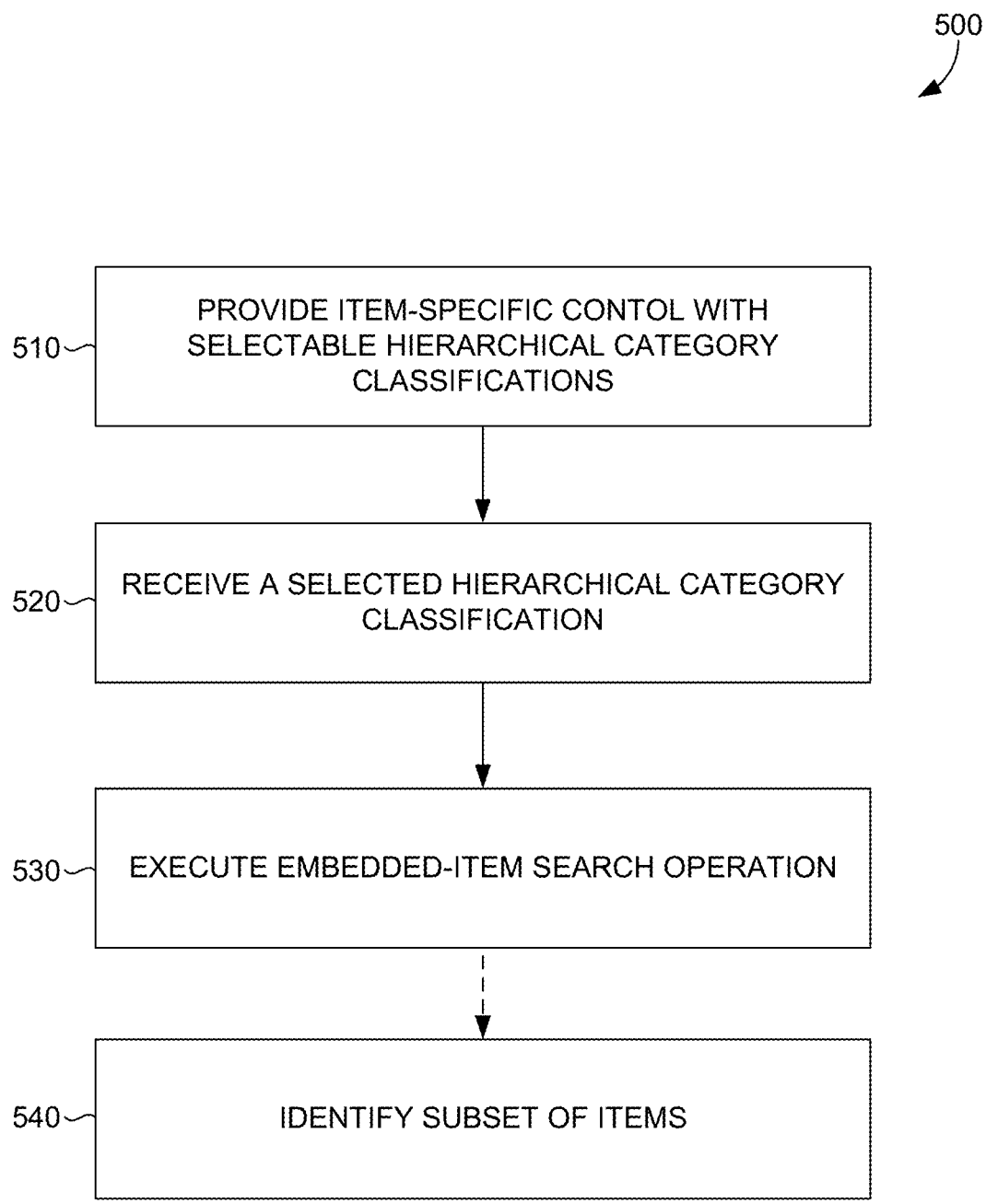
FIG. 5 is a flow diagram showing an exemplary method for implementing a search system with item-based search refinement, in accordance with embodiments described herein.

Turning to FIG. 5, a flow diagram is provided that illustrates a method 500 for implementing a search system for item-based search refinement. Initially at block 510, an item-specific control with selectable hierarchical category classifications is provided. At block 520, a selected hierarchical category classification from the item-specific control is received. At block 530, an embedded-item search operation is executed. In some embodiments, method 500 may progress to block 540 where a subset of items is identified.

Figure 6:
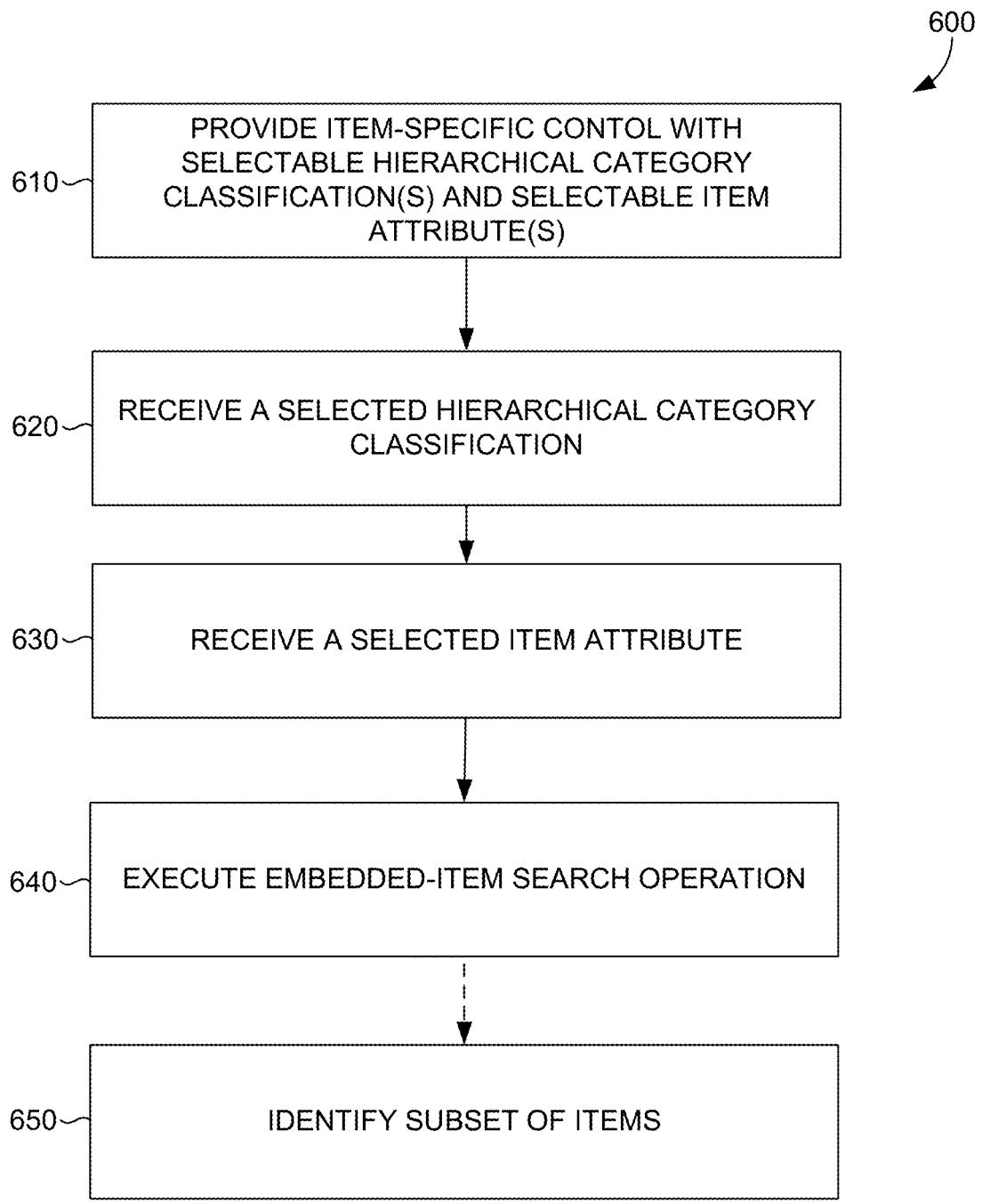
FIG. 6 is a flow diagram showing an exemplary method for implementing a search system with item-based search refinement, in accordance with embodiments described herein.

Turning to FIG. 6, a flow diagram is provided that illustrates a method 600 for implementing a search system for providing item-based search refinement. Initially at block 610, an item-specific control with selectable hierarchical category classification(s) and selectable attribute(s) is provided. At block 620, a selected hierarchical category classification from the item-specific control is received. At block 630, a selected attribute from the item-specific control is received. At block 640, an embedded-item search operation is executed. In some embodiments, method 600 may progress to block 650 where a subset of items is identified.

Figure 7:
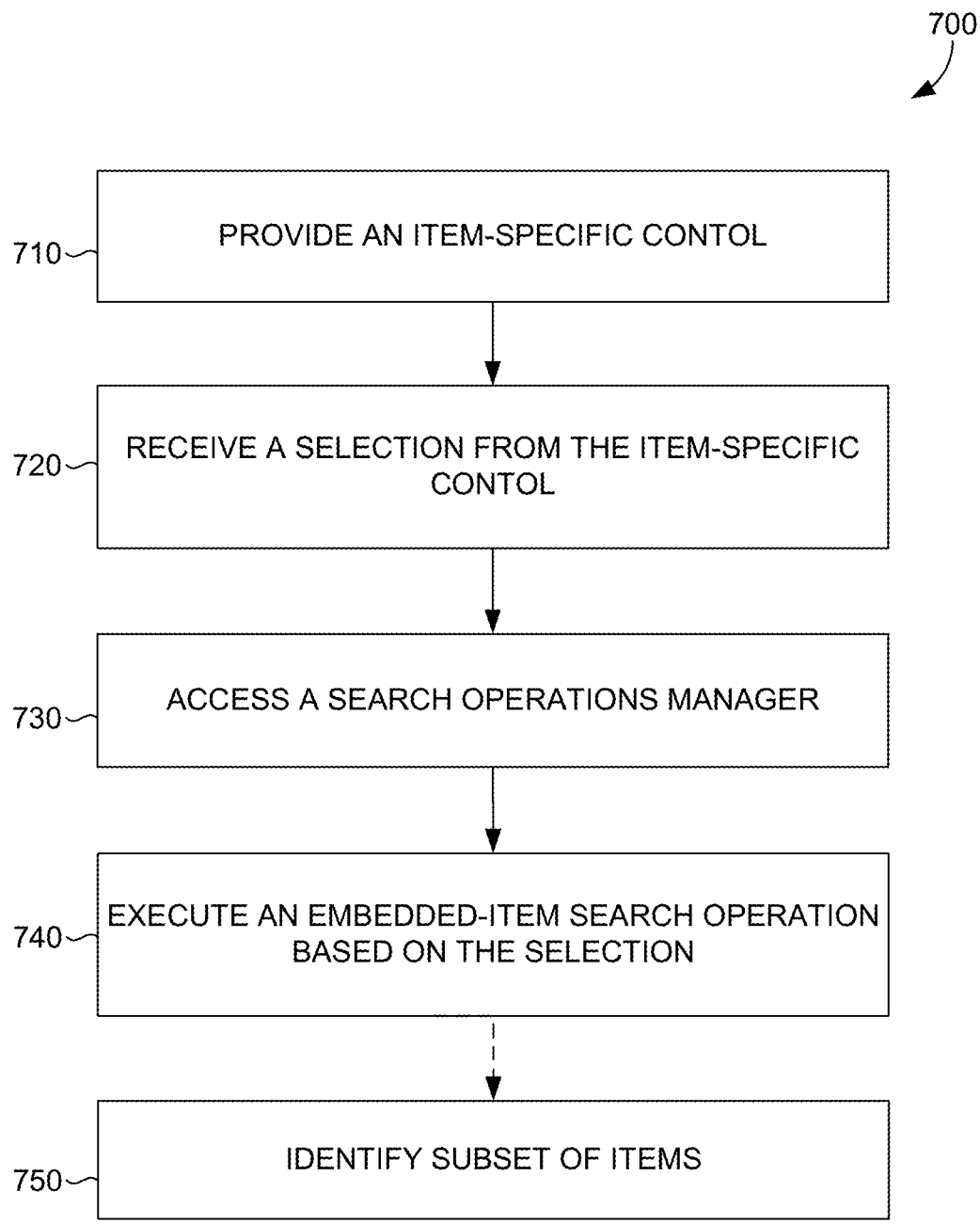
FIG. 7 is a flow diagram showing an exemplary method for implementing a search system with item-based search refinement, in accordance with embodiments described herein.

Turning to FIG. 7, a flow diagram is provided that illustrates a method 700 for implementing a search system for providing item-based search refinement. Initially at block 710, an item-specific control is provided. The item-specific control can be provided upon selection (e.g., an item-specific control may be presented in a collapsed form that can be expanded upon user selection). At block 720, a selection from the item-specific control is received. At block 730, a search operations manager is accessed. At block 740, an embedded-item search operation is executed based on the selection. In some embodiments, method 700 may progress to block 750 where a subset of items is identified.

With reference to the search system 200, embodiments described herein support providing item-based search refinement for a search system. The search system components refer to integrated components that implement the search system. The integrated components refer to the hardware architecture and software framework that support functionality using the search system components. The hardware architecture refers to physical components and interrelationships thereof and the software framework refers to software providing functionality that may be implemented with hardware operated on a device. The end-to-end software-based search system may operate within the other components to operate computer hardware to provide search system functionality. As such, the search system components may manage resources and provide services for the search system functionality. Any other variations and combinations thereof are contemplated with embodiments of the present invention.

By way of example, the search system may include an API library that includes specifications for routines, data structures, object classes, and variables may support the interaction the hardware architecture of the device and the software framework of the search system. These APIs include configuration specifications for the search system such that the components therein may communicate with each other for the novel functionality described herein.

With reference to FIG. 2A, FIG. 2A illustrates an exemplary search system 200 in which implementations of the present disclosure may be employed. In particular, FIG. 2A shows a high level architecture of search system 200 having components in accordance with implementations of the present disclosure. It should be understood that this and other arrangements described herein are set forth only as examples. In addition, a system, as used herein, refers to any device, process, or service or combination thereof. As used herein, engine is synonymous with system unless otherwise stated. A system may be implemented using components, managers, engines, or generators as hardware, software, firmware, a special-purpose device, or any combination thereof. A system may be integrated into a single device or it may be distributed over multiple devices. The various components, managers, engines, or generators of a system may be co-located or distributed. For example, although discussed for clarity as a singular component, operations discussed may be performed in a distributed manner. The system may be formed from other systems and components thereof. It should be understood that this and other arrangements described herein are set forth only as examples.

Having identified various component of the search system 200, it is noted that any number of components may be employed to achieve the desired functionality within the scope of the present disclosure. Although the various components of FIG. 2A are shown with lines for the sake of clarity, in reality, delineating various components is not so clear, and metaphorically, the lines may more accurately be grey or fuzzy. Further, although some components of FIG. 2A are depicted as single components, the depictions are exemplary in nature and in number and are not to be construed as limiting for all implementations of the present disclosure. The search system 200 functionality may be further described based on the functionality and features of the above-listed components.

Other arrangements and elements (e.g., machines, interfaces, functions, orders, and groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 8:
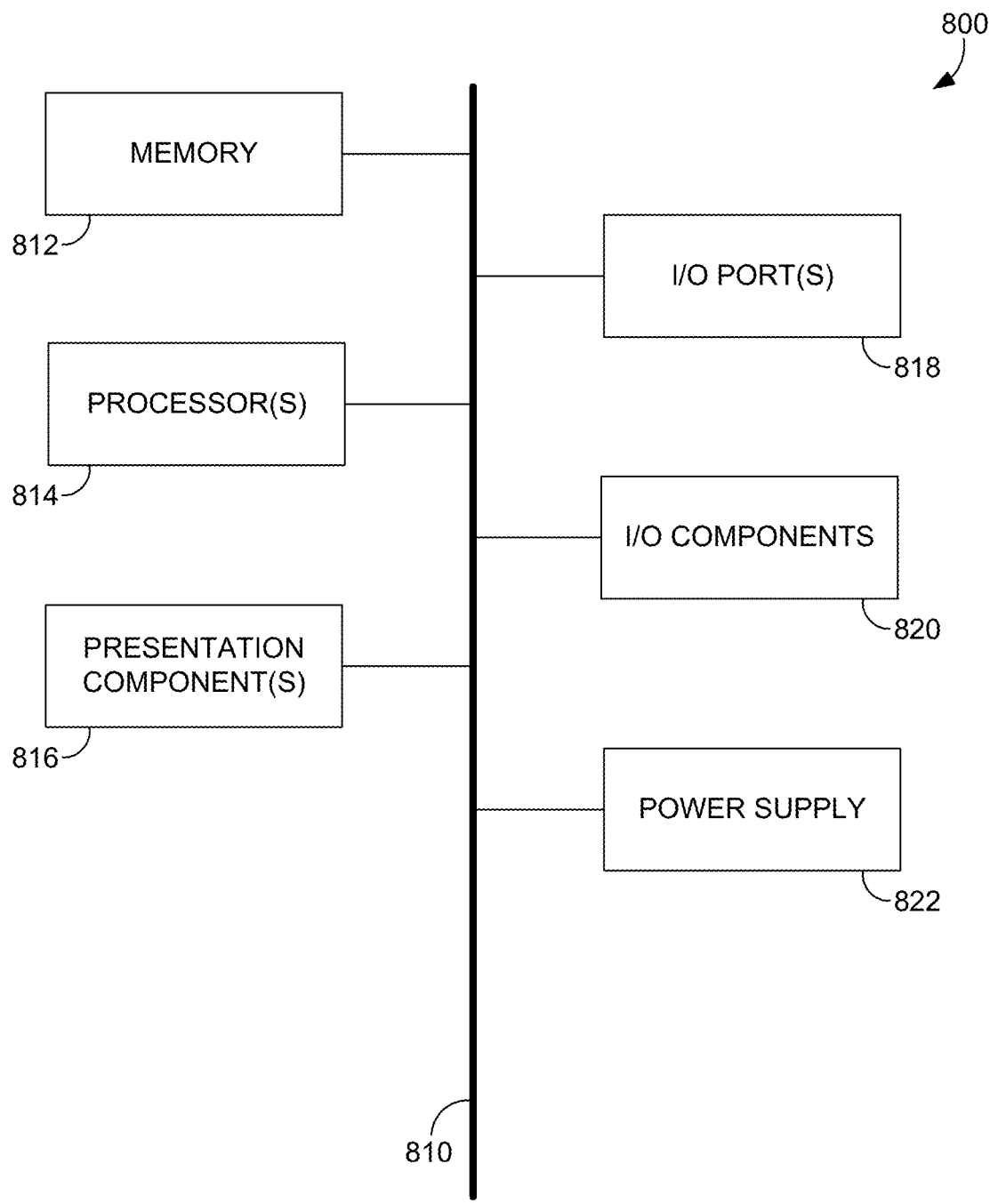
FIG. 8 is a block diagram of an exemplary computing environment suitable for use in implementing embodiments described herein.

Having described an overview of embodiments of the present invention, an exemplary operating environment in which embodiments of the present invention may be implemented is described below in order to provide a general context for various aspects of the present invention. Referring initially to FIG. 8 in particular, an exemplary operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 8 is merely illustrative of an exemplary computing device that may be used in connection with one or more embodiments of the present invention. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media may be any available media that may be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action may be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components may be configured for performing novel aspects of embodiments, where the term "configured for" may refer to "programmed to" perform particular tasks or implement particular abstract data types using code. Further, while embodiments of the present invention may generally refer to the search system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method for providing embedded-item search operations, the method comprising:
    causing simultaneous display of a first image and a second image without hierarchical category classifications associated the first image and the second image, wherein the first image and the second image are search result items, the first image comprising a first item and the second image comprising a second item,
    wherein the first image is associated with a first item-specific control and the second image is associated with a second item-specific control,
    wherein each item-specific control corresponding to the first image and the second image is embedded with at least two hierarchical category classifications that are selectable to initiate embedded-item search operations associated with a first hierarchical category classification or a second hierarchical category classification of the hierarchical category classifications that are specific to a corresponding item;
    based on the simultaneous display of the first image associated with the first item-specific control and the second image associated with the second item-specific control, receiving a trigger associated with the first item-specific control;
    in response to receiving the trigger associated with the first item-specific control, causing display of the at least two hierarchical category classifications;
    receiving a selection of an attribute and a selection of a first hierarchical category classification of the first item-specific control, wherein the first hierarchical category classification of the first item-specific control is a selectable hierarchical category classification of the first item embedded in the first item-specific control;
    based on receiving the selection the attribute and the selection of the first hierarchical category classification, communicating the attribute and the first hierarchical category classification to cause identification of a subset of search result items based on an embedded-item search operation comprising the attribute and the first hierarchical category classification;
    receiving the subset of search result item; and
    causing display of the subset of search result items.

2. The method of claim 1, further comprising:
    receiving a trigger associated with the second item-specific control;
    in response to receiving the trigger associated with the second item-specific control, causing display of the at least two hierarchical category classifications;
    receiving a further selection of a first hierarchical category classification of the second item-specific control, wherein the first hierarchical category classification of the second item-specific control is a selectable hierarchical category classification of the second item embedded in the second item-specific control;
    based on receiving the further selection of the first hierarchical category classification of the second item-specific control, communicating the second hierarchical category classification of the second item-specific control to cause identification of a second subset of search result items based on an second embedded-item search operation comprising the first hierarchical category classification of the second item-specific control;
    receiving the second subset of search result items; and
    causing display of the second subset of search result items.

3. The method of claim 1, wherein each item-specific control is further embedded with an image-based search option that is selectable to initiate the embedded-item search operations.

4. The method of claim 1, wherein each item-specific control is further embedded with a watch option that is selectable to initiate the embedded-item search operations.

5. The method of claim 1, further comprising:
    providing a dynamically updatable count for each of the at least two hierarchical category classifications that indicate a number of search results that have the corresponding at least two hierarchical category classifications.

6. The method of claim 1, wherein each item-specific control is embedded with one or more attributes that are selectable to initiate the embedded-item search operations.

7. One or more computer storage media having computer-executable instructions embodied thereon that, when executed, by one or more processors, cause the one or more processors to perform a method for providing embedded-item search operations, operations comprising:

receiving a trigger associated with an item-specific control of an image comprising an item, wherein the image is one of a plurality of images that were caused to be simultaneously displayed on a webpage without hierarchical category classifications associated the plurality of images, wherein each of the plurality of images is associated with a corresponding item-specific control, wherein the item-specific control of the image is embedded at least two hierarchical category classifications that are selectable to initiate embedded-item search operations associated with a first hierarchical category classification or a second hierarchical category classification of the at least two hierarchical category classifications that are specific to the item;

in response to receiving the trigger associated with the item-specific control, causing display of the at least two hierarchical category classifications;

receiving a selection of an attribute and a selection of a hierarchical category classification from the at least two hierarchical classifications, wherein the attribute is a selectable attribute of the item and the hierarchical category classification is a selectable hierarchical category classification, both embedded in the item-specific control;

based on receiving the selection of the attribute and the selection of the hierarchical category classification, communicating the attribute and the hierarchical category classification to cause identification of a subset of search result items based on an embedded-item search operation comprising the attribute and the hierarchical category classification;

receiving the subset of search result items; and causing display of the subset of search result items.

8. The media of claim 7, wherein the item-specific control is further embedded with an image-based search option that is selectable to initiate the embedded-item search operations.

9. The media of claim 7, wherein the item-specific control is further embedded with a watch option that is selectable to initiate the embedded-item search operations.

10. The media of claim 7, the method further comprising:
providing a dynamically updatable count for each of the at least two hierarchical category classifications that indicate a number of search results that have the at least two hierarchical category classifications.

11. The media of claim 7, the operations further comprising:
upon receiving the selection of the attribute, dynamically generating an anticipated number of search result items for each of the at least two hierarchical category classifications.

12. The media of claim 7, the operations further comprising:
causing display of a second image comprising a second item, wherein the second item is one of the plurality of items, wherein the second image is associated with a second item-specific control, wherein the second item-specific control is embedded with a second set of hierarchical category classifications that are selectable to initiate further embedded-item search operations, wherein the second set of hierarchical category classifications of the second item are specific to the second item, wherein the second set of hierarchical category classifications of the second item is different from the at least two hierarchical category classifications of the item;

receiving a further selection of a second hierarchical category classification associated with the second item-specific control, wherein the second hierarchical category classification is a second selectable hierarchical category classification embedded in the second item-specific control;

based on receiving the further selection of the second hierarchical category classification, communicating the second hierarchical category classification to cause identification of a second subset of search result items based on an second embedded-item search operation comprising the second hierarchical category classification;

receiving the second subset of search result items; and causing display of the second subset of search result items.

13. The media of claim 7, the operations further comprising:
causing display of a second image comprising a second item, wherein the second item is one of the plurality of items, wherein the second image is associated with a second item-specific control, wherein the second item-specific control is embedded with an image analysis option that is selectable to initiate further embedded-item search operations;

receiving a further selection of the image analysis option associated with the second item-specific control, wherein the image analysis option is a selectable image analysis option embedded in the second item-specific control;

based on receiving the further selection of the image analysis option, communicating the image analysis option to cause identification of a second subset of search result items based on an second embedded-item search operation comprising image-based searching related to the image analysis option;

receiving the second subset of search result items; and causing display of the second subset of search result items.

14. The media of claim 7, the operations further comprising:
causing display of a second image comprising a second item, wherein the second item is one of the plurality of items, wherein the second image is associated with a second item-specific control, wherein the second item-specific control is embedded with a watch option that is selectable to initiate further embedded-item search operations;

receiving a further selection of the watch option associated with the second item-specific control, wherein the watch option is a selectable watch option embedded in the second item-specific control; and based on receiving the further selection of the watch option, communicating the watch option to cause a second embedded-item search operation comprising adding the second item to a user watch list.

15. A search system for providing embedded-item search operations, the system comprising:
one or more processors; and
one or more computer storage media storing computer-useable instructions that, when used by the one or more processors, cause the one or more processors to execute:
a search refinement engine to:
receive a trigger associated with an item-specific control of an image comprising an item, wherein the image is one of a plurality of images that were caused to be displayed on a webpage without hierarchical category classifications associated with the plurality of images, wherein each of the plurality of images is associated with a corresponding item-specific control,
wherein the item-specific control of the image is embedded with at least two hierarchical category classifications that are selectable to initiate embedded-item search operations associated with a first hierarchical category classification or a second hierarchical category classification of the at least two hierarchical category classifications that are specific to the item;
in response to receiving the trigger associated with the item specific control, cause display of the at least two hierarchical category classifications;
receive a selection of an attribute and a selection hierarchical category classification associated with the item-specific control, wherein the hierarchical category classification is a selectable hierarchical category classification of the item embedded in the item-specific control;
based on receiving the selection of the hierarchical category classification, communicate the hierarchical category classification to cause identification of a subset of search result items based on an embedded-item search operation comprising the hierarchical category classification;
receive the subset of search result items; and
cause display of the subset of search result items.

16. The system of claim 15, wherein the instructions further cause the one or more processors to execute:
providing a dynamically updatable count for each of the at least two hierarchical category classifications that indicate a number of search results that have the at least two hierarchical category classifications.

17. The system of claim 15, wherein the item-specific control is further embedded with an image-based search option that is selectable to initiate the embedded-item search operations.

18. The system of claim 15, wherein the item-specific control is further embedded with a watch option that is selectable to initiate the embedded-item search operations.

19. The system of claim 17, wherein selection of the image-based search causes a further embedded-item search operation comprising image-based searching related to the image analysis option.

20. The system of claim 18, wherein selection of the watch option causes a further embedded-item search operation that comprises communicating the watch option to add the second item to a user watch list.

* * * * *